June 26, 1973 M. L. WHITE ET AL Re. 27,688

SERVICE TRAY

Original Filed Aug. 25, 1967

Mary Lee White
Donald C. White
INVENTORS

BY Raphael Semmes

ATTORNEY

United States Patent Office

Re. 27,688
Reissued June 26, 1973

27,688
SERVICE TRAY

Mary Lee White and Donald C. White, both of 304 The Royal St. Andrews, 555 S. Gulfstream Ave., Sarasota, Fla. 33577

Original No. 3,401,858, dated Sept. 17, 1968, Ser. No. 663,382, Aug. 25, 1967. Application for reissue Sept. 15, 1970, Ser. No. 72,556
Int. Cl. B65d *1/34*
U.S. Cl. 224—48 R 9 Claims

Matter enclosed in heavy brackets [ ] appears in the original patent but forms no part of this reissue specification; matter printed in italics indicates the additions made by reissue.

ABSTRACT OF THE DISCLOSURE

A service tray having a bottom which is bounded by a substantially vertical, peripheral wall. At one end of the tray the wall is provided with a pair of transversely spaced, oval openings for respectively receiving the thumb and index finger of a user's hand so as to embrace a beverage container resting on the bottom adjacent the openings. The remainder of the tray bottom is designed to receive hors d'oeuvres and the like.

BACKGROUND OF INVENTION

The serving of refreshments to guests at cocktail parties, receptions, and similar gatherings has long presented something of a problem, especially where both food and drink are served. Ordinarily, the guest is required to hold a beverage container in one hand and a small plate with hors d'oeuvres or the like in the other hand, which is both awkward and inconvenient. If the beverage container is temporarily rested upon the plate, it is very likely to slide sideways, with a resultant spillage.

These awkward and objectionable situations have made it highly desirable to design an individual service tray combining the basic functions of a saucer and a service plate which can be supported by one hand so as to leave the other hand free.

SUMMARY

The present invention overcomes these difficulties by providing a service tray which is bounded by a vertical wall or rim, one end of which is provided with openings through which the thumb and index finger of a user may be inserted for grasping a beverage container, while simultaneously supporting the bottom of the tray with the remaining fingers of the same hand. This leaves the balance of the tray for receiving food items, an ash tray, or the like while the other hand is free to pick up the drink, to handle the food, or the cigarette, or to greet another guest.

THE DRAWINGS

Referring to the drawings in which numerals of like character designate similar parts throughout the several views.

DETAILED DESCRIPTION

The service tray of the present invention is generally indicated by the numeral 5 and comprises a bottom 6 which, in the form illustrated, is of elongated, oval shape and bounded by a preferably integral, substantially vetrical wall or rim 7. The tray is formed of any suitable material having the required rigidity, such, for example, as plain fiberboard, plastic impregnated fiberboard, molded foamed plastic, wood, or ceramic material. Thus, the invention is adaptable either for inexpensive, *one-time* [one-ring] use, disposable service trays, or for more durable trays intended for repeated use, such as regular dinnerware.

Figure 1:
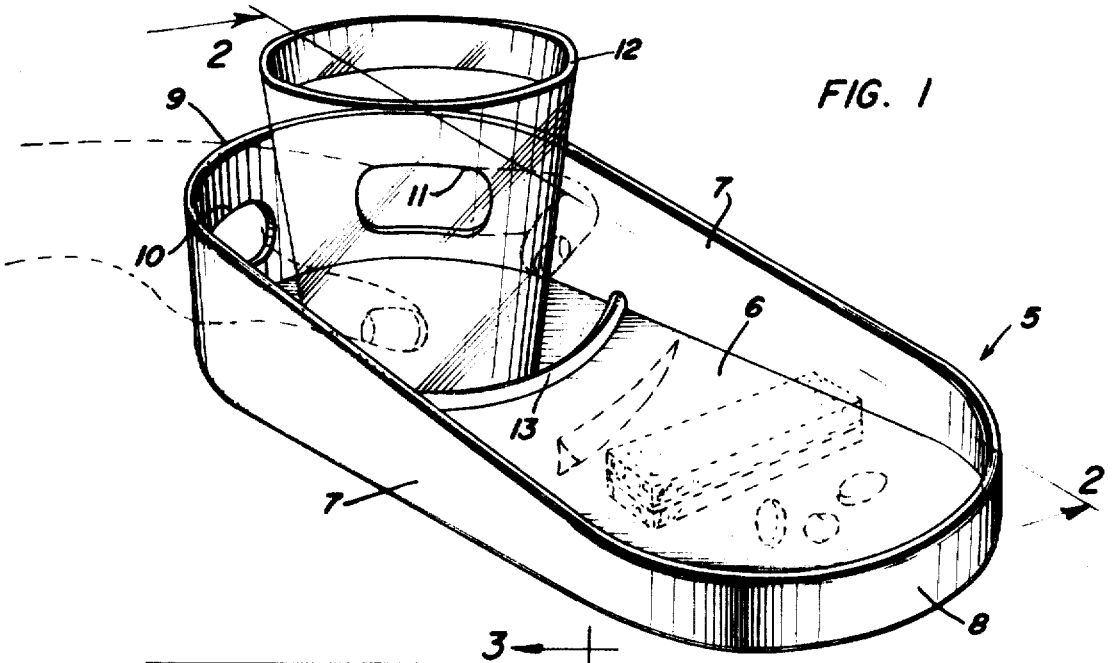
FIG. 1 is a perspective view illustrating a beverage container in place on the tray with the user's hand and fingers shown in dotted lines.
Figure 3:
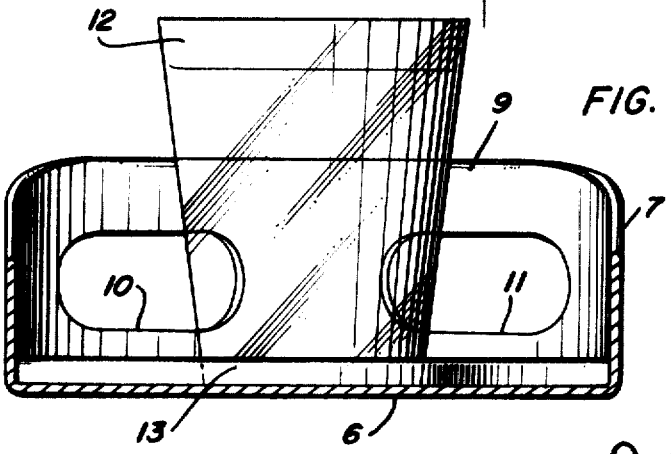
FIG. 3 is a transverse, sectional view taken on line 3—3 of FIG. 2.

Preferably, the bounding wall 7 is relatively shallow at one end 8, and its upper edge is gradually inclined and terminates at the opposite end 9 in a substantially deeper gripping portion. This gripping portion 9 of the wall is provided with a pair of long, oval openings 10 and 11 which are spaced apart laterally and symmetrically with respect to the central portion of the end portion 9 of wall 7. As best seen in FIG. 3, the lengths and positioning of the openings 10 and 11 are such as to facilitate freedom of movement of the thumb and index finger when inserted through respective openings to grip the periphery of a tumbler or other beverage container 12, positioned on the bottom adjacent the openings, as seen in FIG. 1. Thus, the user is enabled to grasp the container 12 with thumb and index finger, while the remaining fingers may be pressed upwardly against the undersurface of the bottom 6 to lend horizontal support to the tray.

Figure 2:
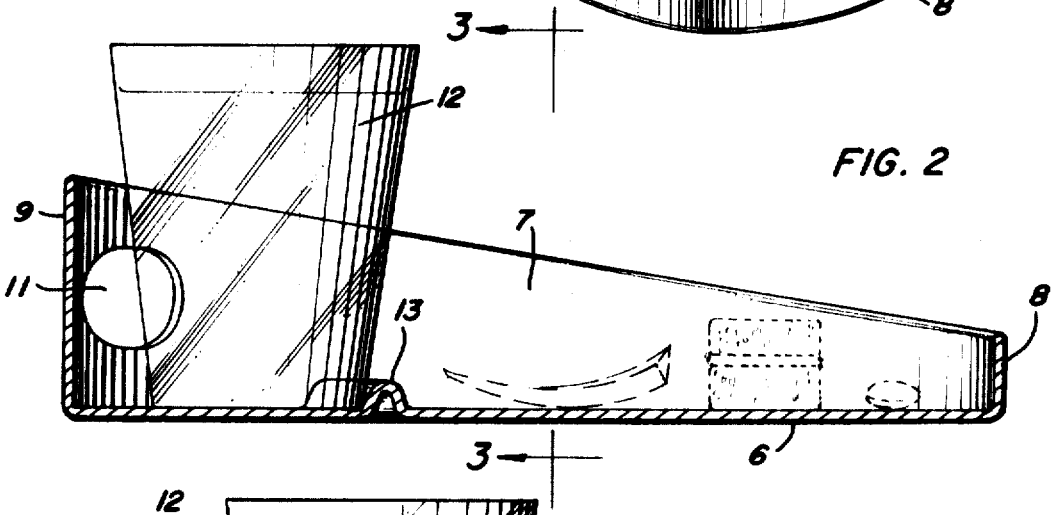
FIG. 2 is a longitudinal, sectional view taken on line 2—2 of FIG. 1.

It will be apparent that with this arrangement of *finger hole* openings in the wall of the tray, the container 12 may be held firmly in place, either simply between the thumb and index finger of the user's hand, or by pulling the container rearwardly to actually engage the end portion 9 of the wall, the height of the wall at this point providing a certain amount of leverage against the glass *or beverage container that is higher than the side wall portion of the tray,* thus making the tray easier to hold in horizontal position. In the case of a long stemmed container, the stem is simply gripped between the thumb and index finger with the extended base resting firmly on the bottom of the tray. With the tray supported in this manner, the bottom portion adjacent end 8 may receive various food items, such as hors d'oeuvres shown in dotted lines in FIGS. 1 and 2, or, in addition, it may receive an ashtray. The entire tray, including the beverage container, being held by one hand, the other hand is left free, as before indicated.

Especially with trays formed of light gauge material, it may be desirable to increase the rigidity of the bottom 6 in addition to that provided by the wall 7 by forming in the bottom a raised rib or ridge 13 which is preferably arcuate in shape and extends from one side wall to the other adjacent the container receiving end 9 of the tray. Such a ridge or rib not only increases rigidity, but also separates the area of the tray on which the beverage container rests from the food receiving area. This effectively prevents spillage or condensation from the beverage from running into the food. Likewise, food items are prevented from sliding, rolling or otherwise getting into the opposite end of the tray to interfere with the placement of the beverage container.

While we have shown the tray of oval shape and with the upper edge of its wall inclined from one end to the other, the invention is by no means limited to this particular contour. However, it is preferred to have at least the gripping end 9 of the tray of substantially arcuate contour so that imaginary lines extending through the axes of the openings 10 and 11 will converge and meet at a point within the area confined by the ridge 13, which facilitates the gripping of a beverage container resting on the bottom of the tray. The wall 7 of the tray may be made sloping so that several trays may be stacked by nesting into each other as for shipping and storing.

We claim:

1. A service tray having a bottom bounded at and adjacent at least one end by a substantially vertical end wall, and a pair of transversely spaced openings extending through said end wall for receiving the inserted thumb and one finger of the user, whereby, when a beverage container is placed on said bottom adjacent said end wall it may be grasped by said inserted thumb and finger, with the remaining fingers of the user engaging and supporting the underside of said bottom.

2. A service tray as claimed in claim 1, wherein said openings are of oval shape to facilitate freedom of movement of said thumb and finger.

3. A service tray as claimed in claim 1, wherein a continuation of said end wall bounds the remainder of said bottom.

4. A service tray as claimed in claim 3, wherein the vertical wall bounding said bottom is of gradually decreasing height from said end wall to the opposite extremity of said bottom.

5. A service tray as claimed in claim 1, wherein said end wall is of arcuate contour.

6. A service tray as claimed in claim 1, wherein the upper surface of said bottom, immediately adjacent the openings in said end wall, is provided with a transversely extending, raised rib for preventing moisture or condensate from said beverage container from reaching the other portion of said bottom.

7. A service tray as claimed in claim 1, wherein said bottom is of substantially oval shape and said end wall is of arcuate contour.

8. A service tray as claimed in claim 7, wherein said openings are symmetrically spaced from the vertical center line of said end wall and their respective axes converge at an imaginary point within the confines of said end wall.

*9. A service tray having a bottom portion and a side wall portion surrounding at least a portion of the bottom, the side wall being so formed with finger hole means that a finger and the thumb of one's hand may be simultaneously projected therethrough below the level of the top of the side wall from the exterior to a position over the bottom portion of the tray so as to grasp a container setting on the tray while the bottom portion of the tray is rested from below on the folded remaining fingers of the same hand and the side wall confines a container which is taller than the side wall against removal from the tray while it is so held.*

References Cited

The following references, cited by the Examiner, are of record in the patented file of this patent or the original patent.

UNITED STATES PATENTS

| | | | |
|---|---|---|---|
| 421,264 | 2/1890 | Gibbons | 220—1 R |
| 2,110,542 | 3/1938 | Allen | 220—85 |
| 2,279,075 | 4/1942 | Street et al. | 215—12 |
| 2,295,860 | 9/1942 | Oliver | 224—48 |
| 2,916,180 | 12/1959 | Alger | 220—23.86 |
| 2,932,432 | 4/1960 | Baumgartner | 220—85 |

FOREIGN PATENTS

| | | | |
|---|---|---|---|
| 2,158 | 1890 | Great Britain | 220—23.83 |

WILLIAM T. DIXSON, Jr., Primary Examiner

U.S. Cl. X. R.

206—72; 220—23.86, 85 R